US012770552B2

(12) United States Patent
Jang et al.

(10) Patent No.: US 12,770,552 B2
(45) Date of Patent: Oct. 20, 2026

(54) PIXEL COMPRISING MICRO LED AND MICRO LED DISPLAY COMPRISING THE SAME

(71) Applicant: ADRC. CO. KR, Seoul (KR)

(72) Inventors: Jin Jang, Seoul (KR); Junyeong Kim, Seoul (KR)

(73) Assignee: ADRC. CO. KR, Seoul (KR)

( * ) Notice: Subject to any disclaimer, the term of this patent is extended or adjusted under 35 U.S.C. 154(b) by 0 days.

(21) Appl. No.: 19/077,340

(22) Filed: Mar. 12, 2025

(65) Prior Publication Data

US 2025/0299626 A1 Sep. 25, 2025

(30) Foreign Application Priority Data

Mar. 22, 2024 (KR) ........................ 10-2024-0039769
Aug. 5, 2024 (KR) ........................ 10-2024-0104084

(51) Int. Cl.

| | |
|---|---|
| ***G09G 3/3233*** | (2016.01) |
| ***G09G 3/20*** | (2006.01) |
| ***G09G 3/32*** | (2016.01) |

(52) U.S. Cl.

CPC ............. *G09G 3/32* (2013.01); *G09G 3/2014* (2013.01); *G09G 3/3233* (2013.01); *G09G 2300/0426* (2013.01); *G09G 2300/043* (2013.01); *G09G 2300/0819* (2013.01); *G09G 2320/064* (2013.01)

(58) Field of Classification Search

CPC ...... G09G 3/2014; G09G 3/32; G09G 3/3233; G09G 2300/0426; G09G 2300/043; G09G 2300/0819; G09G 2320/064

See application file for complete search history.

(56) References Cited

U.S. PATENT DOCUMENTS 11,663,978 B1 5/2023 Jang et al.
12,374,293 B2 * 7/2025 Kim .................... H10K 59/131
2015/0124003 A1 5/2015 Mio
2022/0418068 A1 12/2022 Halbritter (Continued)

FOREIGN PATENT DOCUMENTS

KR 10-2020-0115003 10/2020
KR 10-2023-0137726 10/2023

OTHER PUBLICATIONS

Abidur Rahaman et al., "A High-Gain CMOS Operational Amplifier Using Low-Temperature Poly-Si Oxide TFTs", IEEE Transactions on Electron Devices, vol. 67, No. 2, pp. 524-528, Feb. 2020.

(Continued)

*Primary Examiner* — Julie Anne Watko

(74) *Attorney, Agent, or Firm* — LEX IP MEISTER, PLLC

(57) ABSTRACT

A pixel may include a micro LED, a pulse width modulation (PWM) adjustment circuit that includes an inverter, and controls a light emission period of the micro LED on the basis of an output of the inverter according to a data voltage which is provided to an input terminal of the inverter and a duty driving signal, and a constant current (CC) generating circuit that provides a constant current to the micro LED for the light emission period. The inverter may be implemented with low-temperature polycrystalline silicon and oxide thin-film transistors (LTPO TFTs). A display may include a plurality of pixels such as the above.

20 Claims, 6 Drawing Sheets

(56) References Cited

U.S. PATENT DOCUMENTS

2024/0420625 A1 * 12/2024 Jang .................... G09G 3/3233

OTHER PUBLICATIONS

Yuanfeng Chen et al., "In-pixel temperature sensor for high-luminance active matrix micro-light-emitting diode display using low temperature polycrystalline silicon and oxide thin-filmtransistors", Journal of the Society for Information Display, vol. 28, No. 6, pp. 528-534, May 2020.

* cited by examiner

PIXEL COMPRISING MICRO LED AND MICRO LED DISPLAY COMPRISING THE SAME

CROSS-REFERENCE TO RELATED APPLICATION

This application claims priority to and the benefit of Korean Patent Application Nos. 10-2024-0039769 and 10-2024-0104084 filed with the Korean Intellectual Property Office on Mar. 22, 2024 and Aug. 5, 2024, the entire contents of which are incorporated herein by reference.

BACKGROUND

(a) Technical Field

The present disclosure relates to a pixel comprising a micro LED, and a micro LED display comprising the same.

(b) Description of the Related Art

Micro light-emitting diode (micro LED; μ-LED) may be applied to high-performance displays. Displays with micro LEDs (hereinafter, referred to as μ-LEDs displays) have the advantages of higher brightness, efficiency, and durability than organic light emitting diode (OLED) displays. However, when μ-LEDs are driven in a pulse amplitude modulation (PAM) manner, a color shift problem arises due to wavelength shift.

SUMMARY

The present disclosure attempts to provide a pixel suitable for grayscale display using a μ-LED, and a μ-LED display comprising the same.

A pixel according to a feature of the present disclosure may include a micro LED, a pulse width modulation (PWM) adjustment circuit that includes an inverter, and controls a light emission period of the micro LED on the basis of an output of the inverter according to a data voltage which is provided to an input terminal of the inverter and a duty driving signal, and a constant current (CC) generating circuit that provides a constant current to the micro LED for the light emission period. The inverter may be implemented with low-temperature polycrystalline silicon and oxide thin-film transistors (LTPO TFTs).

The PWM adjustment circuit may include a first transistor that includes one terminal to which the data voltage is input, and is switched in response to a scan signal so as to transfer the data voltage to a first node, a second transistor that includes one terminal to which an initialization voltage is input, and is switched in response to a previous scan signal having an on level for a predetermined period before the scan signal so as to transfer the initialization voltage to the first node, a first capacitor that includes one terminal to which the duty driving signal is input, and another terminal which is connected to the first node, and a second capacitor that is connected between the first node and a second node. The second node may be connected to the input terminal of the inverter.

The inverter may include a third transistor that includes a gate which is connected to the second node, one terminal to which a first voltage is supplied, and another terminal which is connected to a third node, and a fourth transistor that includes a gate which is connected to the second node, one terminal to which a second voltage is supplied, and another terminal which is connected to the third node. The third transistor may be a low-temperature polycrystalline silicon (LTPS) TFT, and the fourth transistor may be an oxide TFT.

The PWM adjustment circuit may further include a fifth transistor that is connected between the second node and the third node and includes a gate to which the previous scan signal is applied.

The PWM adjustment circuit may further include a sixth transistor that includes a gate to which a first light emission signal is applied, one terminal which is connected to the third node, and another terminal which is connected to a fourth node, and a seventh transistor that includes a gate to which the first light emission signal is applied, one terminal to which a first source voltage is supplied, and another terminal which is connected to the fourth node. The first light emission signal may be at an on level for a unit light emission period which is a maximum period for which the pixel can emit light in a unit frame.

The CC generating circuit may include a third capacitor that is connected between an output terminal of the PWM adjustment circuit and a fifth node, a tenth transistor that includes a gate which is connected to the fifth node, one terminal to which a third voltage is supplied, and another terminal which is connected to a sixth node, and an eleventh transistor that is connected between the sixth node and the micro LED and includes a gate to which a second light emission signal is applied. The second light emission signal may be at an on level for the unit light emission period.

The CC generating circuit may further include an eighth transistor that includes one terminal which is connected to the fifth node and another terminal to which the initialization voltage is supplied, and is switched in response to a first compensation signal so as to transfer the initialization voltage to the fifth node, and a ninth transistor that is connected between the fifth node and the sixth node, and is switched in response to a second compensation signal so as to compensate the threshold voltage of the tenth transistor.

The duty driving signal may change during a unit light emission period which is a maximum light emission period of the pixel in a unit frame, and the input of the inverter may change in response to the duty driving signal such that the output of the inverter is inverted.

A μ-LED display according to another feature of the present disclosure may include a plurality of pixels, a data driver that supplies a plurality of data voltages corresponding to the plurality of pixels, a scan driver that supplies a plurality of scan signals corresponding to the plurality of pixels, and a duty driver that supplies a duty driving signal for controlling a light emission period to the plurality of pixels. Each of the plurality of pixels may include a micro LED, a pulse width modulation (PWM) adjustment circuit that includes an inverter, changes an input according to the corresponding data voltage in response to the duty driving signal, provides the changed input to an input terminal of the inverter, and controls a light emission period of the micro LED in response to the output of the inverter, and a constant current (CC) generating circuit that provides a constant current to the micro LED for the light emission period.

The PWM adjustment circuit may include a first transistor that supplies the corresponding data voltage to a first node in response to the corresponding scan signal, a second transistor that transfers an initialization voltage to the first node in response to a previous scan signal of the corresponding scan signal, a first capacitor that includes one terminal to which the duty driving signal is input, and another terminal which is connected to the first node, and a second capacitor that is connected between the first node and a second node. The second node may be connected to the input terminal of the inverter.

The inverter may include a third transistor that includes a gate which is connected to the second node, one terminal to which a first voltage is supplied, and another terminal which is connected to a third node, and a fourth transistor that includes a gate which is connected to the second node, one terminal to which a second voltage is supplied, and another terminal which is connected to the third node. The third transistor may be a low-temperature polycrystalline silicon (LTPS) TFT, and the fourth transistor may be an oxide TFT.

The PWM adjustment circuit may further include a fifth transistor that is connected between the second node and the third node and includes a gate to which the previous scan signal is applied.

The μ-LED display may further include a light emission driver that generates and provides a first light emission signal and a second light emission signal for controlling a unit light emission period which is a maximum light emission period for which light can be emitted in a unit frame with respect to the plurality of pixels.

The PWM adjustment circuit may further include a sixth transistor that includes a gate to which a first light emission signal is applied, one terminal which is connected to the third node, and another terminal which is connected to a fourth node, and a seventh transistor that includes a gate to which the first light emission signal is applied, one terminal to which a first source voltage is supplied, and another terminal which is connected to the fourth node.

The CC generating circuit may include a third capacitor that is connected between an output terminal of the PWM adjustment circuit and a fifth node, a tenth transistor that includes a gate which is connected to the fifth node, one terminal to which a third voltage is supplied, and another terminal which is connected to a sixth node, and an eleventh transistor that is connected between the sixth node and the micro LED and includes a gate to which the second light emission signal is applied.

The μ-LED display may further include a compensation driver that generates a first compensation signal for controlling an initialization operation on the fifth node, and a second compensation signal for controlling an operation of compensating the threshold voltage of the tenth transistor.

The CC generating circuit may further include an eighth transistor that includes one terminal which is connected to the fifth node, another terminal to which the initialization voltage is supplied, and a gate to which the first compensation signal is supplied, and a ninth transistor that is connected between the fifth node and the sixth node, and includes a gate to which the second compensation signal is supplied.

A pixel according to a further feature of the present disclosure may include a first wiring line that supplies a duty driving signal and extends in a first direction, a first electrode that extends in a second direction, different from the first direction, from the first wiring line, a second electrode that constitutes a first capacitor together with the first electrode, a third electrode that constitutes a second capacitor together with the second electrode, a first gate electrode that is connected to the third electrode and overlaps a first semiconductor layer, a second gate electrode that is connected to the third electrode and overlaps the first semiconductor layer, and a third gate electrode that is connected to the second gate electrode and overlaps a second semiconductor layer. A first transistor which includes the first semiconductor layer, the first gate electrode, and the second gate electrode, and a second transistor which includes the second semiconductor layer and the third gate electrode may constitute an inverter.

The pixel may further include a second wiring line that extends in the second direction and supplies a data voltage, a third wiring line that extends in the first direction and supplies a scan signal, a fourth wiring line that extends in the second direction and supplies an initialization voltage, a fifth wiring line that extends in the first direction and supplies a previous scan signal, a third transistor that includes one terminal which is connected to the second wiring line, a third semiconductor layer which overlaps the second wiring line, and another terminal which is connected to the second electrode, and a fourth transistor that includes one terminal which is connected to the fourth wiring line, a fourth semiconductor layer which overlaps the fourth wiring line, and another terminal which is connected to the second electrode.

The pixel may further include a fourth electrode that is connected to one terminal of the second transistor, a fifth electrode that is connected to one terminal of the first transistor and the fourth electrode, a sixth wiring line that extends in the first direction and supplies a light emission signal, a third gate electrode that is connected to a sixth electrode extending in the second direction from the sixth wiring line, and overlaps a fifth semiconductor layer, a fourth gate electrode that is connected to the sixth electrode and overlaps the fifth semiconductor layer, and a fifth transistor that includes one terminal which is connected to the fifth electrode, the fifth semiconductor layer, the third gate electrode, and the fourth gate electrode.

The pixel may further include a seventh wiring line that extends in the second direction and supplies a first voltage, a seventh electrode that is connected to the seventh wiring line, and a sixth transistor that includes a sixth semiconductor layer which overlaps the sixth wiring line, and one terminal which is connected to the seventh electrode.

The pixel may further include an eighth electrode that is connected to another terminal of the fifth transistor, a ninth electrode that is connected to another terminal of the sixth transistor, a tenth electrode that is connected to the eighth electrode and the ninth electrode, and an eleventh electrode that constitutes a third capacitor together with the tenth electrode.

The present disclosure provides a pixel suitable for grayscale display using a μ-LED, and a μ-LED display comprising the same.

DETAILED DESCRIPTION OF THE EMBODIMENTS

Hereinafter, exemplary embodiments disclosed in this specification will be described in detail with reference to the accompanying drawings; however, the same or similar constituent elements are denoted by the same or similar reference symbols, and a repeated description thereof will not be made.

Further, when describing exemplary embodiments disclosed in this specification, detailed descriptions of publicly known technologies will be omitted if it is determined that specific description thereof may obscure the gist of the exemplary embodiments disclosed in this specification. Furthermore, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinal number, such as first and second, are used for describing various constituent elements, but the constituent elements are not limited by the terms. The terms are used only to discriminate one constituent element from another constituent element.

When a constituent element is referred to as being "connected" or "coupled" to another constituent element, it will be appreciated that it may be directly connected or coupled to the other constituent element or intervening other constituent elements may be present. In contrast, when a constituent element is referred to as being "directly connected" or "directly coupled" to another constituent element, it will be appreciated that there are no intervening other constituent elements present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 1:
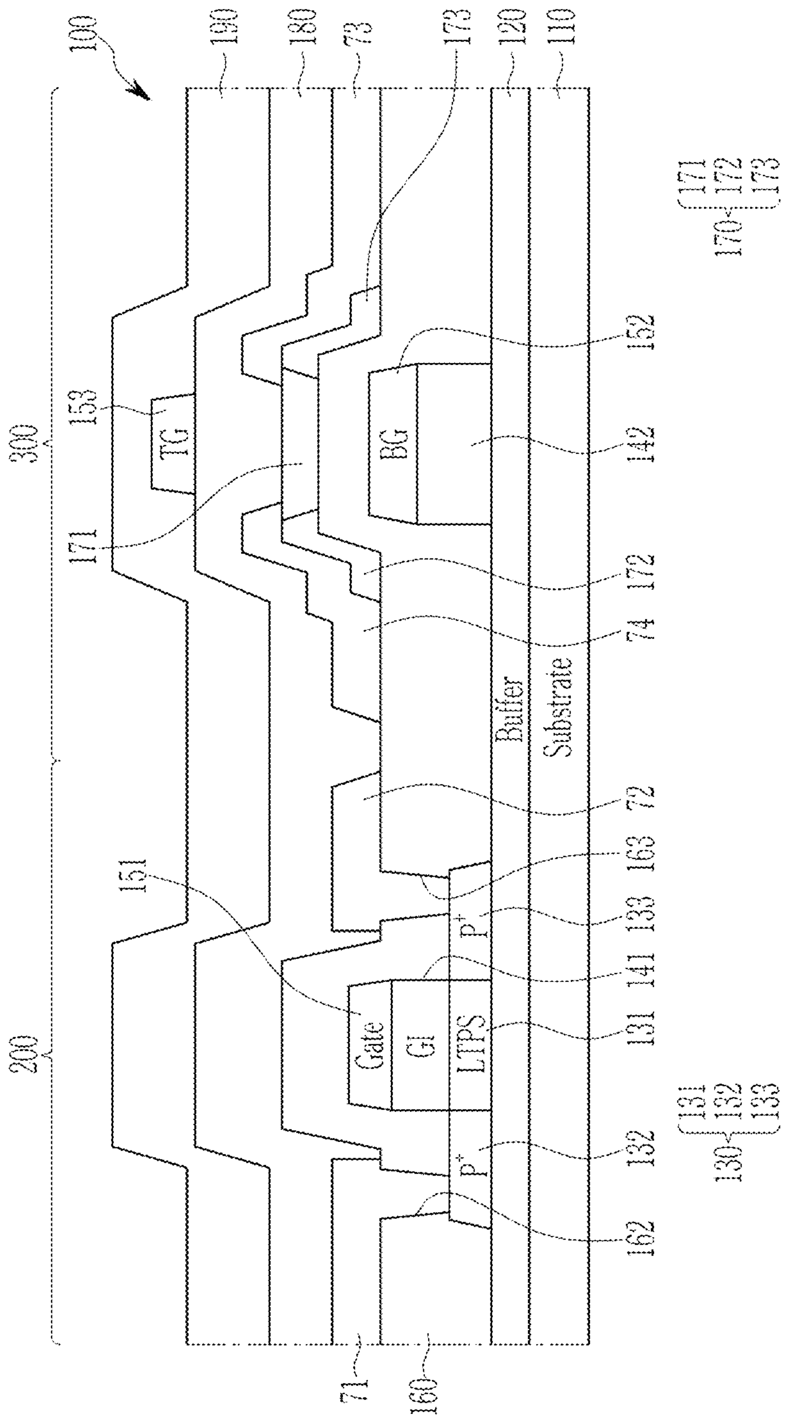
FIG. 1 is a cross-sectional view illustrating the structure of a complementary transistor according to an exemplary embodiment.

FIG. 1 is a cross-sectional view illustrating the structure of a transistor according to an exemplary embodiment.

A transistor 100 according to an exemplary embodiment includes a first transistor 200 and a second transistor 300. The transistor 100 may be implemented as a low-temperature polycrystalline silicon and oxide thin-film transistor (LTPO TFT). The first transistor 200 may be a low-temperature polycrystalline silicon (LTPS) TFT. The second transistor 300 may be implemented as an oxide TFT, for example, as an amorphous-indium-gallium-zinc-oxide (a-IGZO) TFT which is an example of the oxide TFT.

In a process of crystallizing a-Si of the first transistor 200, blue laser annealing (BLA) may be used. Then, high mobility due to a larger grain size as compared to excimer laser annealing (ELA) may be provided. The second transistor 300 may be a double-gate (DG) n-type TFT. The second transistor 300 may be formed by back channel etch (BCE). The top gate (TG) and bottom gate (BG) of the second transistor 300 may be electrically connected such that the on-state current of the second transistor 300 is high and the threshold voltage is constant at 0 V. In respect to a specific manufacturing process of the first and second transistors 200 and 300, the following two well-known papers may be referred to. Therefore, a detailed description of the manufacturing process will not be made. The case where the second transistor 300 is a double-gate structure is an example for describing an exemplary embodiment, and the second transistor 300 of the present invention may be implemented as a single-gate oxide TFT.

1) A. Rahaman, H. Jeong and J. Jang, "A High-Gain CMOS Operational Amplifier Using Low-Temperature Poly-Si Oxide TFTs," IEEE Transactions on Electron Devices, vol. 67, no. 2, pp. 524-528, February 2020.
2) Y. Chen, S. Lee, H. Kim, J. Lee, D. Geng, and J. Jang, "In-pixel temperature sensor for high-luminance active matrix micro-light-emitting diode display using low-temperature polycrystalline silicon and oxide thin-film-transistors," J. Soc. Inf. Display, vol. 28, no. 6, pp. 528-534, May 2020.

Referring to FIG. 1, a buffer layer 120 is positioned on a substrate 110. The buffer layer 120 may have a single layer or multi-layer structure. In FIG. 1, the buffer layer 120 is shown as a single layer; however, in some exemplary embodiments, the buffer layer may consist of multiple layers. The buffer layer 120 may contain an organic insulating material or an inorganic insulating material. As an example, the buffer layer 120 may contain at least one of silicon nitride ($SiN_x$), silicon oxide ($SiO_x$), and silicon oxynitride ($SiO_xN_y$).

On the buffer layer 120, a first semiconductor layer 130 which includes a first region 131, a second region 132, and a third region 133 is positioned.

The semiconductor layer 130 may contain poly-silicon, for example, low temperature poly-silicon (LTPS).

The first region 131 of the semiconductor layer 130 is a channel region, and the second region 132 and the third region 133 of the first semiconductor layer (131, 132, and 133) may be a source region and a drain region.

The sheet resistance of the first region 131 which is the channel region of the first semiconductor layer (131, 132, and 133) is larger than the sheet resistance of the second region 132 and the third region 133 which are the source region and drain region of the first semiconductor layer (131, 132, and 133), and the carrier concentration of the first region 131 which is the channel region of the first semiconductor layer (131, 132, and 133) is lower than the carrier concentrations of the second region 132 and the third region 133 which are the source region and drain region of the first semiconductor layer (131, 132, and 133).

The first region 131 which is the channel region of the first semiconductor layer (131, 132, and 133) may not contain impurities. The concentrations of impurities in the second region 132 and third region 133 of the first semiconductor layer (131, 132, and 133) may be higher than the concentration of impurities in the first region 131 of the first semiconductor layer (131, 132, and 133).

The second region 132 and the third region 133 of the first semiconductor layer (131, 132, and 133) may contain impurities, for example, N-type impurities or P-type impurities. For example, the N-type impurities may be phosphorus (P), arsenic (As), or antimony (Sb), and the P-type impurities may be boron (B), aluminum (Al), or indium (In).

On the first region 131 of the first semiconductor layer (131, 132, and 133), a gate insulating film (GI) 141 is positioned. The gate insulating film 141 may contain an organic insulating material or an inorganic insulating material, and as an example, the gate insulating film 141 may contain at least one of silicon nitride, silicon oxide, silicon oxynitride, and tetra ethyl ortho silicate (TEOS).

On the gate insulating film 141, a first gate electrode 151 is positioned. The first gate electrode 151 is disposed so as to overlap the first region 131 of the first semiconductor layer (131, 132, and 133), and the gate insulating film 141 is positioned between the first region 131 of the first semiconductor layer (131, 132, and 133) and the gate electrode 151.

The first gate electrode 151 may be a multi-layer film including a metal film containing at least one of copper (Cu), a copper alloy, aluminum (Al), an aluminum alloy, molybdenum (Mo), and a molybdenum alloy.

An insulating pattern 142 may be positioned on the buffer layer 120. On the insulating pattern 142, a bottom gate (BG) electrode 152 may be positioned. The insulating pattern 142 and the gate insulating film 141 may be formed in the same process step, the bottom gate electrode 152 and the first gate electrode 151 may be formed in the same process step.

On the first semiconductor layer (131, 132, and 133), the first gate electrode 151, and the bottom gate electrode 152, a passivation layer 160 is positioned. The passivation layer 160 may contain at least one of silicon nitride, silicon oxide, silicon oxynitride, and tetra ethyl ortho silicate (TEOS), and may be formed of an organic material such as a polyacrylates resin or a polyimides resin, or a laminated film of an organic material and an inorganic material.

The passivation layer 160 has a first contact hole 162 which overlaps the second region 132 of the first semiconductor layer (131, 132, and 133), and a second contact hole 163 which overlaps the third region 133 of the first semiconductor layer (131, 132, and 133).

On the passivation layer 160, a second semiconductor layer (171, 172, and 173) which overlaps the bottom gate electrode 152 and includes a first region 171, a second region 172, and a third region 173 is positioned. The second semiconductor layer (171, 172, and 173) may contain an oxide semiconductor.

The oxide semiconductor may contain at least one of oxides of single-component metals such as oxides of indium (In), oxides of tin (Sn), or oxides of zinc (Zn), oxides of two-component metals such as In—Zn-based oxides, Sn—Zn-based oxides, Al—Zn-based oxides, Zn—Mg-based oxides, Sn—Mg-based oxides, In—Mg-based oxides, or In—Ga-based oxides, oxides of three-component metals such as In—Ga—Zn-based oxides, In—Al—Zn-based oxides, In—Sn—Zn-based oxides, Sn—Ga—Zn-based oxides, Al—Ga—Zn-based oxides, Sn—Al—Zn-based oxides, In—Hf—Zn-based oxides, In—La—Zn-based oxides, In—Ce—Zn-based oxides, In—Pr—Zn-based oxides, In—Nd—Zn-based oxides, In—Sm—Zn-based oxides, In—Eu—Zn-based oxides, In—Gd—Zn-based oxides, In—Tb—Zn-based oxides, In—Dy—Zn-based oxides, In—Ho—Zn-based oxides, In—Er—Zn-based oxides, In—Tm—Zn-based oxides, In—Yb—Zn-based oxides, or In—Lu—Zn-based oxides, and oxides of four-component metals such as In—Sn—Ga—Zn-based oxides, In—Hf—Ga—Zn-based oxides, In—Al—Ga—Zn-based oxides, In—Sn—Al—Zn-based oxides, In—Sn—Hf—Zn-based oxides, or In—Hf—Al—Zn-based oxides. For example, the second semiconductor layer (171, 172, and 173) may contain an indium-gallium-zinc oxide (IGZO) of the In—Ga—Zn-based oxides.

The second semiconductor layer (171, 172, and 173) may contain at least one of indium-gallium-zinc oxide (IGZO), indium-zinc-tin oxide (IZTO), indium-gallium-zinc-tin oxide (IGZTO), and indium-gallium oxide (IGO).

The first region 171 of the second semiconductor layer (171, 172, and 173) is a channel region, and the second region 172 and third region 173 of the second semiconductor layer (171, 172, and 173) may be a source region and a drain region.

On the passivation layer 160, a first source electrode 71 and a first drain electrode 72 are positioned, and on the passivation layer 160 and the second semiconductor layer (171, 172, and 173), a second source electrode 73 and a second drain electrode 74 are positioned.

The first source electrode 71 and the first drain electrode 72 are coupled to the second region 132 which is the source region of the first semiconductor layer (131, 132, and 133) and the third region 133 which is the drain region of the first semiconductor layer (131, 132, and 133) through the first contact hole 162 and the second contact hole 163 in the passivation layer 160.

The second source electrode 73 and the second drain electrode 74 may be positioned on the second region 172 which is the source region of the second semiconductor layer (171, 172, and 173) and the third region 173 which is the drain region of the second semiconductor layer (171, 172, and 173).

The first source electrode 71, the first drain electrode 72, the second source electrode 73, and the second drain electrode 74 may contain an aluminum-based metal, a silver-based metal, and a copper-based metal having low specific resistance, and may be, for example, a triple-layer structure of a lower film containing a refractory metal such as titanium, molybdenum, chromium, and tantalum, or an alloy thereof, an intermediate film containing an aluminum-based metal, a silver-based metal, or a copper-based metal having low specific resistance, and an upper film containing a refractory metal such as titanium, molybdenum, chromium, and tantalum, or an alloy thereof.

On the first source electrode 71, the first drain electrode 72, the second source electrode 73, and the second drain electrode 74, a second gate insulating film 180 may be positioned, and on the second gate insulating film 180, a top gate (TG) electrode 153 may be positioned.

The top gate electrode 153 and the bottom gate electrode 152 may overlap the first region 171 which is the channel region of the second semiconductor layer (171, 172, and 173).

On the top gate electrode 153, a second passivation layer 190 may be positioned.

The first semiconductor layer (131, 132, and 133) may form the first transistor 200 together with the first gate electrode 151, the first source electrode 71, and the first drain electrode 72. The channel region of the first transistor 200 may be formed in the first region 131 between the second region 132 and third region 133 of the first semiconductor layer (131, 132, and 133).

Similarly, the second semiconductor layer (171, 172, and 173) may form the second transistor 300 together with the bottom gate electrode 152, the top gate electrode 153, the second source electrode 73, and the second drain electrode 74. The channel region of the second transistor 300 is formed in the first region 171 between the second region 172 and third region 173 of the second semiconductor layer (171, 172, and 173).

Although not shown in FIG. 1, in at least one of the second gate insulating film 180 and the second passivation layer 190, a contact hole for coupling the first source electrode 71 and the second source electrode 73 to a line (not shown in the drawings) for supplying a predetermined voltage may be positioned. Also, in at least one of the second gate insulating film 180 and the second passivation layer 190, a contact hole for coupling the first drain electrode 72 and the second drain electrode 74 to each other may be positioned.

In the description made with reference to FIG. 1, the source electrode and the drain electrode are terms for distinguishing two electrodes constituting the transistor; however, unlike in the above description, the source electrode may be a drain electrode and the drain electrode may be a source electrode.

Figure 2:
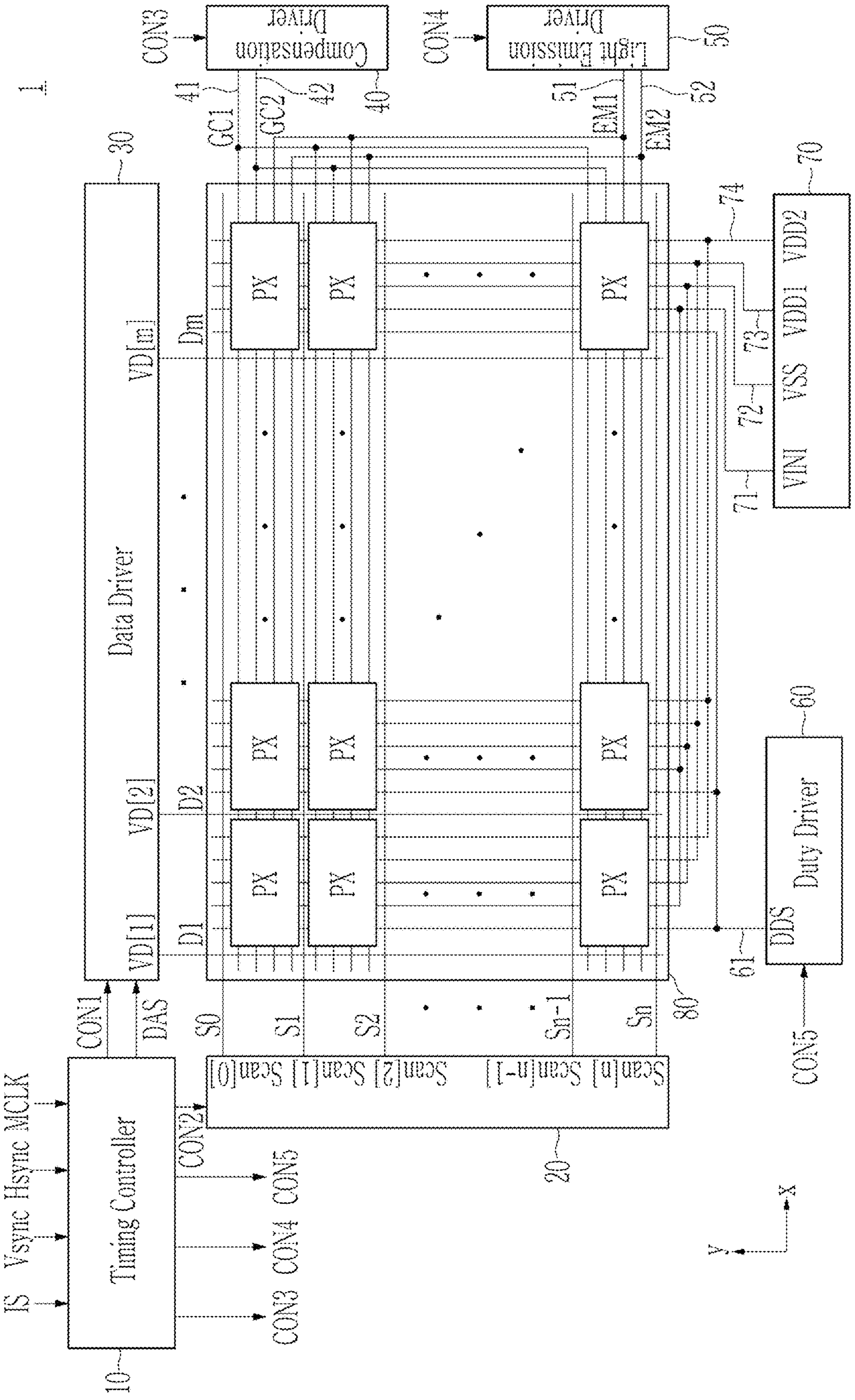
FIG. 2 is a view illustrating a micro LED display according to an exemplary embodiment.

FIG. 2 is a view illustrating a micro LED display according to an exemplary embodiment.

As shown in FIG. 2, a display 1 includes a timing controller 10, a scan driver 20, a data driver 30, a compensation driver 40, a light emission driver 50, a duty driver 60, a power supply circuit 70, and a display unit 80.

The timing controller 10 converts an image source IS, which is provided from the outside, into an image data signal DAS, and transmits the image data signal to the data driver 30. The timing controller 10 receives a vertical synchronization signal Vsync, a horizontal synchronization signal Hsync, and a clock signal MCLK, generates a plurality of control signals CON1, CON2, CON3, CON4, and CON5 for controlling the operations of the scan driver 20, the data driver 30, the compensation driver 40, the light emission driver 50, and the duty driver 60, respectively, and transmits the control signals to them, respectively.

The display unit 80 may include a plurality of pixels PX, a plurality of scan lines S0 to Sn, a plurality of data lines D1 to Dm, two compensation control lines 41 and 42, two light emission control lines 51 and 52, a duty control line 61, and four voltage supply lines 71 to 74. The plurality of pixels PX is arranged in the form of a matrix, and may display at least one color of red, green, and blue. Each of the plurality of scan lines S0 to Sn extends in an x-axis direction, and the plurality of scan lines S0 to Sn is arranged in a y-axis direction. Each of the plurality of data lines D1 to Dm extends in the y-axis direction, and the plurality of data lines D1 to Dm is arranged in the x-axis direction. Each of the plurality of pixels PX is connected to two corresponding scan lines of the plurality of scan lines S0 to Sn. For example, among the plurality of pixels PX, the pixels PX in the first pixel row are connected to two scan lines S0 and S1, and the pixels PX in the n-th pixel row are connected to two scan lines Sn−1 and Sn. Each of the plurality of pixels PX is connected to a corresponding data line of the plurality of data lines D1 to Dm. Each of the plurality of pixels PX is connected to two light emission control lines 51 and 52, two compensation control lines 41 and 42, the duty control line 61, and four voltage supply lines 71 to 74.

In the display unit 80 of FIG. 2, two compensation control lines 41 and 42 and two light emission control lines 51 and 52 extend in the x-axis direction, and the duty control line 61 and four voltage supply lines 71 to 74 extend in the y-axis direction. The extension directions of two compensation control lines 41 and 42, two light emission control lines 51 and 52, the duty control line 61, and four voltage supply lines 71 to 74 shown in FIG. 2 are examples, and the present disclosure is not limited thereto.

Each of the plurality of pixels PX is initialized in response to a previous scan signal which is provided from one of two scan lines and a compensation signal GC1 which is provided through the compensation control line 41, and stores a data voltage, which is transmitted through a corresponding data line of the plurality of data lines D1 to Dm, in response to a current scan signal which is provided from the other of the two scan lines. Each of the plurality of pixels PX compensates the threshold voltage of the driving transistor in response to a compensation signal GC2 which is provided through the compensation control line 42, starts light emission in response to two light emission signals EM1 and EM2 which are provided through two light emission control lines 51 and 52, and ends the light emission in response to the stored data voltage and a duty driving signal DDS which is provided through the duty control line 61.

The scan driver 20 may generate a plurality of scan signals Scan[0] to Scan[n] in response to the control signal CON2, and provide the plurality of scan signals Scan[0] to Scan[n] to the plurality of scan lines S0 to Sn, respectively. The scan driver 20 may generate a plurality of scan signals Scan[0] to Scan[n] which sequentially has an on level.

The data driver 30 may convert an image data signal into a plurality of data voltages VD[1] to VD[m] in response to the control signal CON2, and provide the plurality of data voltages VD[1] to VD[m] to the plurality of data lines D1 to Dm, respectively.

The compensation driver 40 may generate two compensation signals GC1 and GC2 in response to the control signal CON3, and the two compensation signals GC1 and GC2 to the two compensation control lines 41 and 42, respectively.

The light emission driver 50 may generate two light emission signals EM1 and EM2 in response to the control signal CON4, and provide the two light emission signals EM1 and EM2 to the two light emission control lines 51 and 52, respectively.

The duty driver 60 may generate the duty driving signal DDS in response to the control signal CON5, and provide the duty driving signal DDS to the duty control line 61.

The power supply circuit 70 may generate four voltages VDD1, VDD2, VSS, and VINI necessary to drive the plurality of pixels PX, and supply the four voltages VDD1, VDD2, VSS, and VINI to the four voltage supply lines 71, 72, 73, and 74, respectively.

Figure 3:
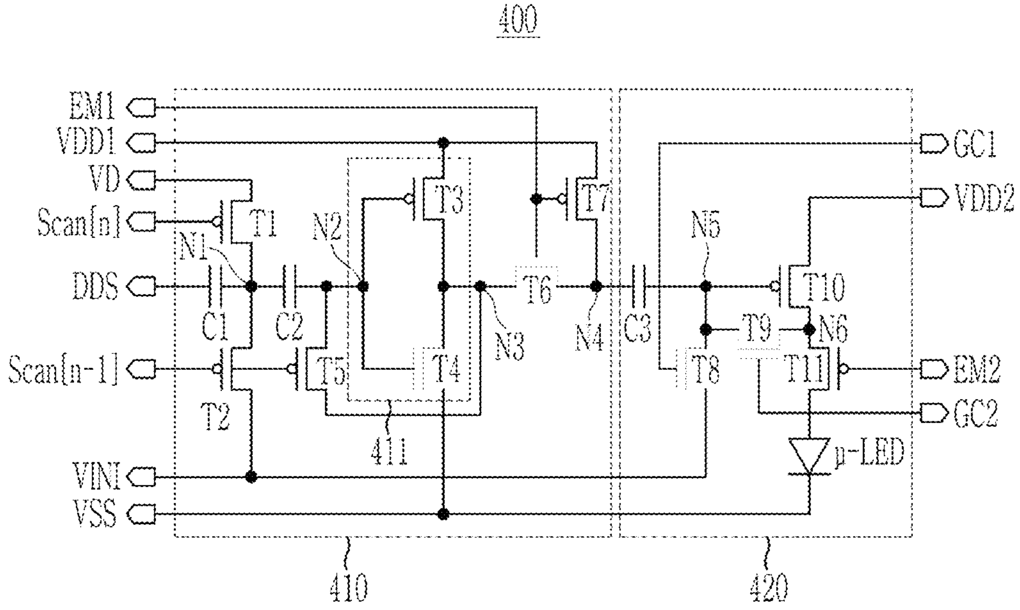
FIG. 3 is a circuit diagram illustrating the pixel circuit of one of a plurality of pixels according to an exemplary embodiment.

FIG. 3 is a circuit diagram illustrating the pixel circuit of one of a plurality of pixels according to an exemplary embodiment.

As shown in FIG. 3, a pixel circuit 400 may include eleven transistors T1 to T11, three capacitors C1 to C3, and a micro light-emitting diode (micro LED 401. The pixel circuit 400 may be implemented based on the transistor 100 described with reference to FIG. 1. For example, seven transistors T1 to T3, T5, T7, T10, and T11 may be implemented as LTPS TFTs, and four transistors T4, T6, T8, and T9 may be implemented as oxide TFTs. The seven transistors T1 to T3, T5, T7, T10, and T11 may be p-channel type transistors, and the four transistor T4, T6, T8, and T9 may be n-channel type transistors.

The pixel circuit 400 may be driven at a frame rate of 120 Hz, and may provide 256 gray levels. The pixel circuit 400 may drive the micro LED 401 at a constant brightness for a period according to the data voltage written in the pulse width modulation (PWM) manner. The data voltage may be one of 256 voltage levels indicating the 256 gray levels. The pixel circuit 400 may be applied to a display having 8-bit grayscale data.

The pixel circuit 400 may include a PWM adjustment circuit 410 and a constant current (CC) generating circuit 420. The PWM adjustment circuit 410 may include the seven transistors T1 to T7 and the two capacitors C1 and C2, and the CC generating circuit 420 may include the transistors T8 to T11 and the capacitor C3. The PWM adjustment circuit 410 may adjust the light emission period according to the data voltage which is written, and the CC generating circuit 420 may generate a constant light emission current regardless of the grayscale. The pixel circuit 400 may supply the light emission current, which is provided by the CC generating circuit 420, to the micro LED for the light emission period which is determined by the PWM adjustment circuit 410.

First, the components of the pixel circuit 400 will be described with reference to FIG. 3.

The pixel circuit 400 shown in FIG. 3 may be the pixel circuit of a pixel of the plurality of pixels PX constituting the n-th pixel row. Each of the plurality of pixels PX may include the pixel circuit 400 shown in FIG. 3. In the following description, one terminal of a transistor may be one of the source and the drain, and the other terminal of the transistor may be the other of the source and the drain. Each transistor may be turned on and off in response to the level of a signal which is applied to the gate. For example, each p-channel type transistor may be turned on when the signal which is applied to the gate is at the low level, and turned off when the signal is at the high level. Each n-channel type transistor may be turned on when the signal which is applied to the gate is at the high level, and turned off when the signal is at the low level.

The PWM adjustment circuit 410 may control the light emission period in response to a data voltage VD. The data voltage VD may be one of the plurality of data voltages VD[1] to VD[m] generated by the data driver 30. After storing the data voltage VD, the PWM adjustment circuit 410 may change the stored voltage in response to the duty driving signal DDS, and provide one of an on voltage and an off voltage to the CC generating circuit 420 according to the changed voltage. In the PWM adjustment circuit 410, the data voltage VD is stored at a node N2, and the voltage at the node N2 may vary depending on the duty driving signal DDS. In the PWM adjustment circuit 410, the voltage at a node N4 may be one of the on voltage and the off voltage.

To one terminal of the transistor T1, the data voltage VD is supplied, and to the gate of the transistor T1, the scan signal Scan[n] is applied, and the other terminal of the transistor T1 is connected to a node N1. One terminal of the transistor T2 is connected to the node N1, and to the other terminal of the transistor T2, the initialization voltage VINI is supplied, and to the gate of the transistor T2, the previous scan signal Scan[n−1] is applied. One terminal of the transistor T5 is connected to the node N2, and the other terminal of the transistor T5 is connected to the node N3, and to the gate of the transistor T5, the previous scan signal Scan[n−1] is applied. To one terminal of the capacitor C1, the duty driving signal DDS is applied, and the other terminal of the capacitor C1 is connected to the node N1, and one terminal of the capacitor C2 is connected to the node N1, and the other terminal of the capacitor C2 is connected to the node N2.

To one terminal of the transistor T3, the voltage VDD1 is supplied, and the other terminal of the transistor T3 is connected to the node N3, and the gate of the transistor T3 is connected to the node N2. One terminal of the transistor T4 is connected to the node N3, and to the other terminal of the transistor T4, the voltage VSS is supplied, and the gate of the transistor T4 is connected to the node N2. The transistor T3 and the transistor T4 may constitute an inverter, such that when the transistor T3 is turned on by the voltage at the node N2, the voltage VDD1 is supplied to the node N3, and when the transistor T4 is turned on by the voltage at the node N2, the voltage VSS is supplied to the node N3. The voltage range of the node N2 which turns on the transistor T3 is at a relatively lower level than the voltage range of the node N2 which turns on the transistor T4, and the voltage VDD1 is at a higher level than the voltage VSS. When the voltage at the node N2 is an input and the voltage at the node N3 is an output, for a relatively lower input, the relatively higher voltage VDD1 may be output, and for a relatively higher input, the relatively lower voltage VSS may be output.

One terminal of the transistor T6 is connected to the node N3, and the other terminal of the transistor T6 is connected to the node N4, and to one terminal of the transistor T7, the voltage VDD1 is supplied, and the other terminal of the transistor T7 is connected to the node N4, and to the gate of the transistor T6 and the gate of the transistor T7, the light emission signal EM1 is applied.

The CC generating circuit 420 generates a constant current and supplies the constant current to the micro LED (μ-LED) while the on voltage is supplied, and does not generate current to drive the micro LED (μ-LED) while the off voltage is supplied.

One terminal of the transistor T8 is connected to a node N5, and to the other terminal of the transistor T8, the initialization voltage VINI is supplied, and to the gate of the transistor T8, the control signal GC1 is applied. One terminal of the transistor T9 is connected to the node N5, and the other terminal of the transistor T9 is connected to a node N6, and to the gate of the transistor T9, the control signal GC2 is applied. One terminal of the capacitor C3 may be connected to the node N4, and the other terminal of the capacitor C3 may be connected to the node N5.

To one terminal of the driving transistor T10, the voltage VDD2 may be supplied, and the other terminal of the driving transistor T10 may be connected to the node N6, and the gate of the driving transistor may be connected to the node N5. One terminal of the transistor T11 is connected to the node N6, and the other terminal of the transistor T11 is connected to the anode of the micro LED (μ-LED), and to the gate of the transistor T11, the light emission signal EM2 is applied. To the cathode of the micro LED (μ-LED), the voltage VSS may be supplied.

In the pixel circuit 400 shown in FIG. 3, the voltage VDD1, the voltage VDD2, and the voltage VSS may be 3 V, 5 V, and −3 V, respectively. The voltage range of each of the scan signal Scan[n], the previous scan signal Scan[n−1], the light emission signal EM1, the light emission signal EM2, the control signal GC1, and the control signal GC2 may be from −10 V to 10 V. The duty driving signal DDS may vary in a range from 0 V to 10 V. The data voltage VD may be a voltage in a range from −6.04 V to 6 V, and the initialization voltage VINI may be 0 V.

Figure 4:
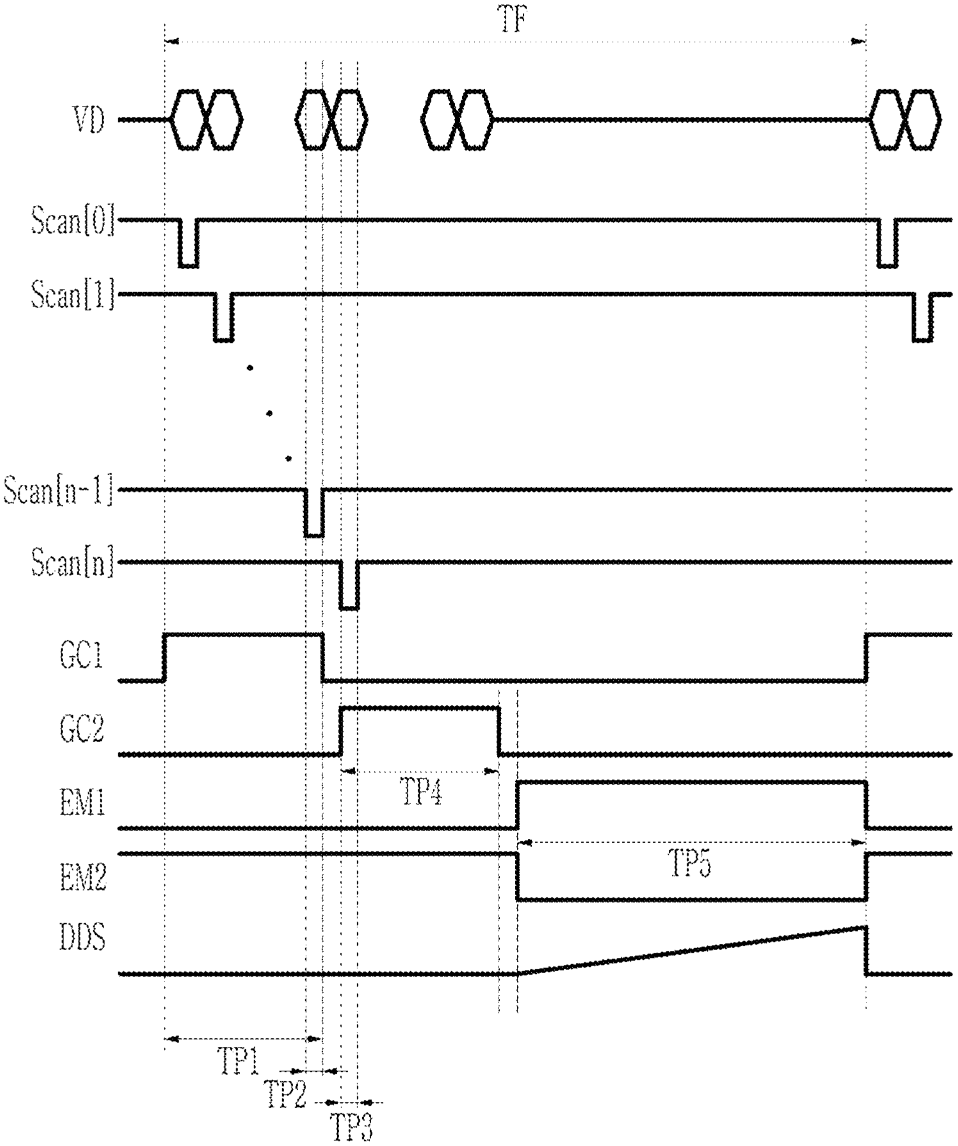
FIG. 4 is a waveform diagram illustrating a plurality of signal waveforms according to an exemplary embodiment.

FIG. 4 is a waveform diagram illustrating a plurality of signal waveforms according to an exemplary embodiment.

The operation of the pixel circuit 400 shown in FIG. 3 will be described with reference to FIG. 4.

In FIG. 4, a period TF represents one frame section, and the waveform of each of the signals shown in FIG. 4 may be repeated in the unit of a period TF.

During an initialization period TP1, the control signal GC1 is at the on level (10 V), and the transistor T8 may be turned on such that the node N5 is charged with the initialization voltage VINI. During the initialization period TP1, in each of the plurality of pixel rows, the transistor T2 also may be turned on by the on level pulse (−10 V) of the previous scan signal such that the node N1 is charged with the initialization voltage VINI. During the initialization period TP1, in each of the plurality of pixel rows, the transistor T5 may be turned on by the on level pulse (−10 V) of the previous scan signal such that the node N2 and the node N3 are connected to each other. For example, in a period TP2 of the initialization period TP1, by the on level pulse (−10 V) of the previous scan signal Scan[n−1], the transistor T2 may be turned on such that the node N1 is charged with the initialization voltage VINI, and the transistor T5 may be turned on such that the node N2 and the node N3 are connected to each other. In FIG. 4, the previous scan signal for the first pixel row connected to the scan line S1 among the plurality of pixel rows is shown by "Scan[0]". The scan driver 20 may generate and provide the scan signal Scan[0] for controlling the initialization operation.

During the period TP2, the node N2 and the node N3 are connected such that the two transistors T3 and T4 constituting the inverter form diode connections. Then, the threshold voltage of the inverter is stored between the node N2 and the node N3. A reference voltage at which the output of an inverter 411, i.e., the voltage at the node N3 is inverted when the input, i.e., the voltage at the node N2 sweeps is the inverter threshold voltage. The inverter threshold voltage VTH1 of the inverter 411 may depend on the threshold voltages of the two transistors T3 and T4. During the period TP2, the inverter threshold voltage VTH1 depending on the threshold voltage of each of the two transistors T3 and T4 having the diode connections may be applied to the node N2.

During a period TP3, the transistor T2 and the transistor T5 are in the off state, and the transistor T1 is in the on state due to the scan signal Scan[n] at the on level (−10 V). Then, the voltage at the node N1 is charged with the data voltage VD. During the period TP3, the node N2 and the node N3 are in the state where they are electrically disconnected from each other. The voltage change (VINI-VD) at the node N1 may be reflected in the node N2 through the coupling of the capacitor C2 such that the voltage VN2 at the node N2 becomes a voltage to which the inverter threshold voltage VTH1 has changed by (VINI-VD) (Expression 1).

$$VN2 = VTH1 - (VINI - VD) \quad \text{[Expression 1]}$$

When the voltage VN2 is a voltage lower than the inverter threshold voltage VTH1, the transistor T3 may be turned on such that the voltage VN3 at the node N3 is the voltage VDD1. In contrast, when the voltage VN2 is a voltage equal to or higher than the inverter threshold voltage VTH1, the transistor T4 may be turned on such that the voltage VN3 is the voltage VSS.

During a period TP4, the control signal GC1 is at the off level, and the control signal GC2 is at the on level. Then, the transistor T8 is in the off state, and the transistor T9 is in the on state. The transistor T10 may form a diode connection due to the transistor T9 in the on state such that the threshold voltage VTH10 of the transistor T10 is stored between the node N5 and the node N6. Then, the voltage VN5 at the node N5 may be stored in the capacitor C3. Therefore, the voltage VN5 at the node N5 may be a voltage lower than the voltage VDD2 by the threshold voltage VTH10 of the transistor T10 (Expression 2).

$$\text{VN5\_TP4} = VDD2 - |VTH10| \quad \text{[Expression 2]}$$

During a period TP5, the light emission signal EM1 may transition to the high level such that the transistor T6 is turned on and the transistor T7 is turned off. During the period TP5, since the light emission signal EM2 is at the low level, the transistor T11 is in the on state. The period TP5 may be set to a maximum period for which a pixel PX can emit light in a unit frame (hereinafter, referred to as the "unit light emission period"), and be controlled by the on level period of the light emission signal EM1. The on level period of the light emission signal EM2 may depend on the unit light emission period. During the period TP5, the duty driving signal DDS may increase, and the voltage VN2 at the node N2 may increase due to the increasing duty driving signal DDS, thereby reaching the inverter threshold voltage VTH1. Then, the transistor T3 may be turned off and the transistor T4 may be turned on, such that the voltage VN3 at the node N3 becomes the voltage VSS.

During the period TP5, since the transistor T6 is in the on state, the voltage VN3 at the node N3 and the voltage VN4 at the node N4 are equal. When the voltage VN3 at the node N3 becomes the voltage VSS due to the duty driving signal DDS, the voltage at the node N4 also may change from the voltage VDD1 to the voltage VSS. A voltage change at the node N4 may be reflected in the voltage VN5 at the node N5 due to the coupling of the capacitor C3. During the period TP5, when the voltage VN3 at the node N3 becomes the voltage VSS due to the duty driving signal DDS, the voltage VN5_TP5 at the node N5 may become a voltage lower than the voltage VN5_TP4 of Expression 2 by (VDD1−VSS) (Expression 3).

$$\text{VN5\_TP5} = \text{VN5\_TP4} - (VDD1 - VSS) = VDD2 - |VTH10| - (VDD1 - VSS) \quad \text{[Expression 3]}$$

The higher the data voltage VD, the higher the voltage VN2 at the start time of the period TP5, and therefore, the earlier the node N3 becomes the voltage VSS. Conversely, the lower the data voltage VD, the lower the voltage VN2 at the start time of the period TP5, and therefore, the later the node N3 becomes the voltage VSS. In other words, the higher the data voltage VD, the earlier the driving transistor T10 is turned on, and therefore, the longer the light emission period in the period TP5, and the lower the data voltage VD, the later the driving transistor T10 is turned on, and therefore, the shorter the light emission period in the period TP5. In this way, the pixel circuit 400 may perform PWM driving according to the data voltage VD.

During the period TP5, since the voltage VN5_TP5 at the node N5 is the gate voltage of the transistor T10 and the source voltage of the transistor T10 is VDD2, the source-gate voltage VSG_T10 of the transistor T10 is represented by the following Expression 4.

$$\text{VSG\_T10} = |VTH10| + (VDD1 - VSS) \quad \text{[Expression 4]}$$

The source-gate voltage VSG_T10 of the transistor T10 becomes equal to or higher than the threshold voltage of the transistor T10, such that the transistor T10 is turned on and a current according to the square of a voltage obtained by subtracting the absolute value of the threshold voltage VTH10 of the transistor T10 from the source-gate voltage VSG_T10 flows in the transistor T10. Accordingly, a driving current that is not affected by a threshold voltage deviation and IR voltage drop of the driving transistor T10 can be supplied to the micro LED (μ-LED).

Figure 5A:
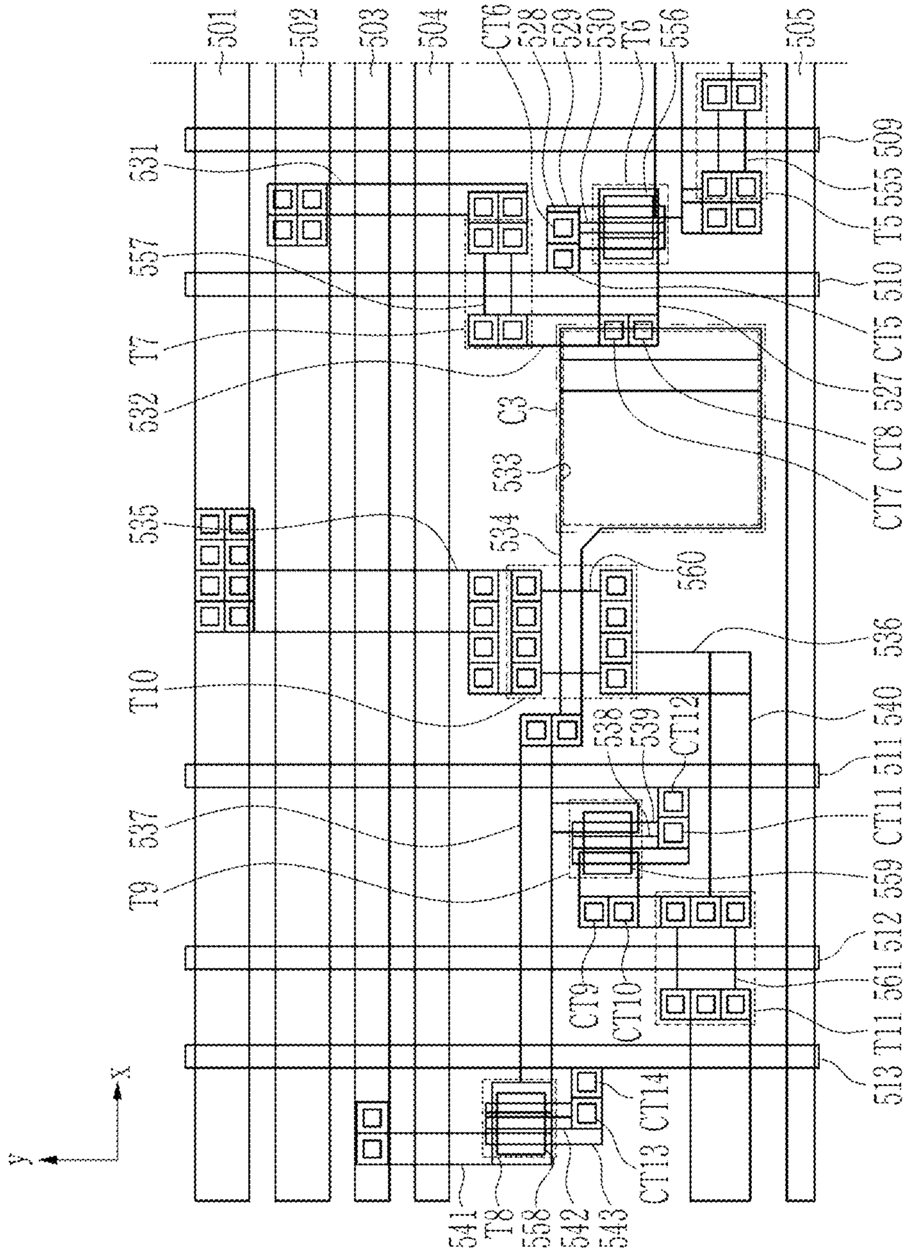
FIG. 5 is a plan view illustrating a pixel circuit according to an exemplary embodiment.
Figure 5B:
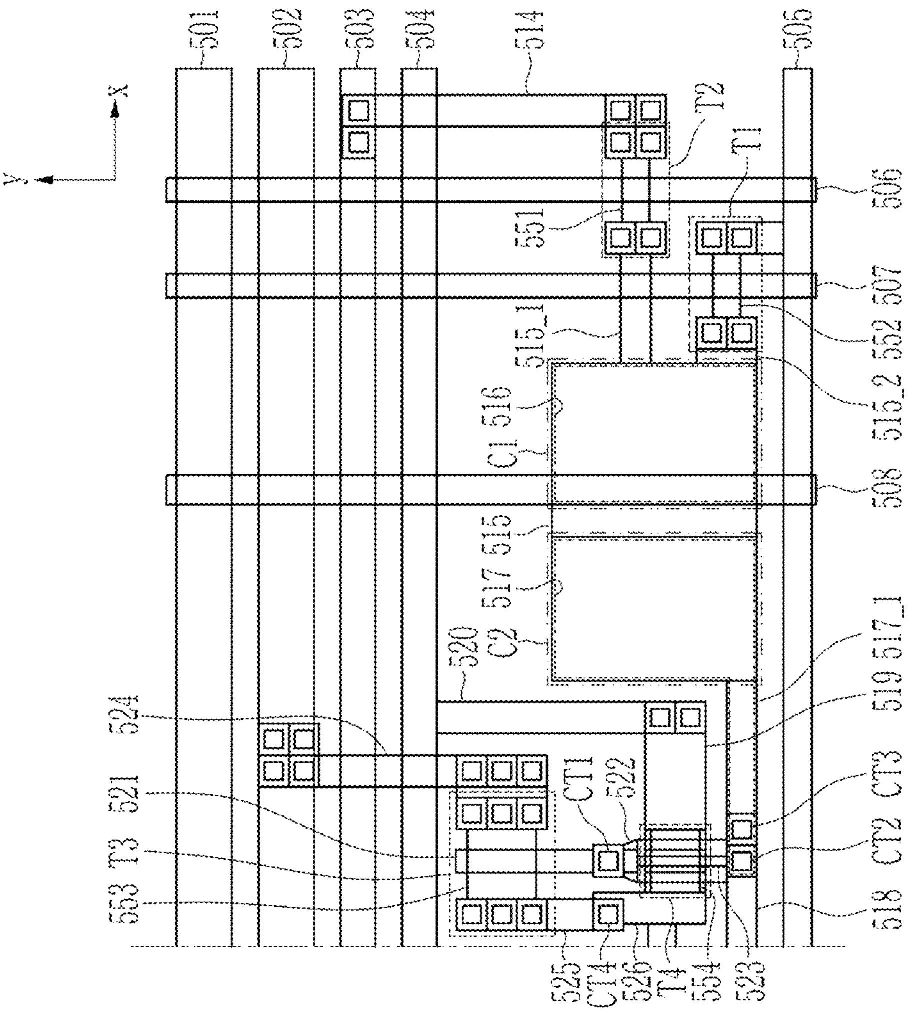

FIG. 5 is a plan view illustrating a pixel circuit according to an exemplary embodiment.

The plan view of the pixel circuit shown in FIG. 5 is a plan view of the pixel circuit before layers constituting a micro LED are stacked. FIG. 5 shows a plurality of transistors T1 to T11 and a plurality of capacitors C1 to C3 which constitute a pixel circuit 400. In the following description, each of one terminal and the other terminal of a transistor refers to one of the source and the drain, and when each of one terminal and the other terminal of a transistor is referred to as being connected to an electrode or a wiring line, it means that each of one terminal and the other terminal of the transistor is connected to the electrode or the wiring line through a contact. In addition, the connection between an electrode and another electrode and the connection between an electrode and a wiring line means a connection through a contact.

A wiring line 505 is a line which extends in the x-axis direction and supplies the data voltage VD. A wiring line 503 is a line which extends in the x-axis direction and supplies the initialization voltage. One terminal of the transistor T2 may be connected to the wiring line 503 through an electrode 514. One terminal of the transistor T1 may be connected to the wiring line 505. A wiring line 506 may extend in the y-axis direction, supply the previous scan signal Scan[n−1], and overlap a semiconductor layer 551 of the transistor T2 so as to serve as the gate electrode of the transistor T2. A wiring line 507 may extend in the y-axis direction, supply the scan signal Scan[n], and overlap a semiconductor layer 552 of the transistor T1 so as to serve as the gate electrode of the transistor T1. The wiring line 508 may extend in the y-axis direction and supply the duty driving signal DDS. An electrode 516 (shown by a dotted box) and an electrode 515 extending in the x-axis direction from the wiring line 508 may constitute the capacitor C1. The electrode 515 may include a region 515_2 which extends in the x-axis direction so as to be connected to the transistor T1, and a region 515_1 which extends in the x-axis direction so as to be connected to the transistor T2. An electrode 517 and the electrode 515 may constitute the capacitor C2. The electrode 517 may include a region 517_1 which extends in the x-axis direction so as to be connected to the gate of the transistor T3, the gate of the transistor T4, and the transistor T5.

One terminal of the transistor T4 is connected to the wiring line 504 through electrodes 519 and 520. The wiring line 504 is a wiring line which supplies the voltage VSS. An electrode 523 is connected to an electrode 518 and the region 517_1 of the electrode 517 through a contact CT2, and overlaps a semiconductor layer 554 of the transistor T4 so as to be able to serve as the gate electrode of the transistor T4. An electrode 521 is connected to an electrode 522 through a contact CT1, and overlaps a semiconductor layer 553 of the transistor T3 so as to be able to serve as the gate electrode of the transistor T3. The electrode 522 is connected to the electrode 518 and the region 517_1 of the electrode 517 through the contact CT2, and the electrode 522 overlaps the semiconductor layer 554 of the transistor T4 so as to be able to serve as the gate electrode of the transistor T4. In other words, the transistor T4 may be implemented in a double-gate structure. The electrode 518 is connected to the region 517_1 of the electrode 517 through contacts CT2 and CT3. One terminal of the transistor T3 is connected to a wiring line 502 through an electrode 524. The wiring line 502 is a wiring line which supplies the voltage VDD1. The other terminal of the transistor T3 is connected to an electrode 525, and the other terminal of the transistor T4 is connected to an electrode 526, and the electrode 525 and the electrode 526 are connected through a contact CT4.

One terminal of the transistor T5 is connected to the electrode 518, and the other terminal of the transistor T5 is connected to the electrode 526. A wiring line 509 extends in the y-axis direction, similar to the wiring line 507, and supplies the previous scan signal Scan[n−1], and overlaps a semiconductor layer 555 of the transistor T5 so as to be able to serve as the gate electrode of the transistor T5. One terminal of the transistor T6 is connected to the electrode 526, and the other terminal of the transistor T6 is connected to an electrode 527. A wiring line 510 extends in the y-axis direction, and may supply the light emission signal EM1. An electrode 528 and an electrode 529 extending in the x-axis direction from the wiring line 510 are connected to contacts CT5 and CT6, and an electrode 530 is connected to the electrode 528 and the electrode 529 through the contact CT6. The electrode 529 and the electrode 530 overlap a semiconductor layer 556 so as to be able to the gate electrode of the transistor T6.

One terminal of the transistor T7 is connected to an electrode 531, and the electrode 531 is connected to the wiring line 502. The other terminal of the transistor T7 is connected to an electrode 532, and the electrode 532 is connected to the electrode 527 and an electrode 533 through contacts CT7 and CT8. The wiring line 510 overlaps a semiconductor layer 557 of the transistor T7 so as to be able to serve as the gate electrode of the transistor T7.

The electrode 533 (shown by a dotted box) and an electrode 534 constitute the capacitor C3. An electrode 534 extends in the x-axis direction, and overlaps a semiconductor layer 560 of the transistor T10 so as to be able to serve as the gate electrode of the transistor T10. One terminal of the transistor T10 is connected to a wiring line 501 through an electrode 535. The wiring line 501 may supply the voltage VDD2. The electrode 534 is connected to an electrode 537 through contacts CT9 and CT10, and a region in the electrode 537 extending in the y-axis direction is connected to one terminal of the transistor T9. The other terminal of the transistor T9 is connected to an electrode 538, and is connected to the electrode 536 through the contacts CT9 and CT10. The electrode 538 extends in an "L" shape from a wiring line 511 so as to overlap a semiconductor layer 559 of the transistor T9. Accordingly, the electrode 538 may serve as the gate electrode of the transistor T9. The wiring line 511 may supply the compensation signal GC2. An electrode 539 is connected to the wiring line 511 through contacts CT11 and CT12, and overlaps a semiconductor layer 559 of the transistor T9 so as to be able to serve as the gate electrode.

The electrode 536 is connected to the other terminal of the transistor T10, and connected to one terminal of the transistor T11. The other terminal of the transistor T11 may be connected to an electrode 540, and the electrode 540 may be connected to the anode of the micro LED. A wiring line 512 supplies the light emission signal EM2, and overlaps a semiconductor layer 561 of the transistor T11 so as to be able to serve as the gate electrode.

One terminal of the transistor T8 is connected to an electrode 541, and the electrode 541 is connected to the wiring line 503. The wiring line 503 may supply the initialization voltage. The other terminal of the transistor T8 is connected to the electrode 537. A wiring line 513 may supply the compensation signal GC1. An electrode 542 extends in an "L" shape from the wiring line 513 so as to overlap a semiconductor layer 558 of the transistor T8. Accordingly, the electrode 542 may serve as the gate electrode of the transistor T9. An electrode 543 is connected to the wiring line 513 through contacts CT13 and CT14, and overlaps the semiconductor layer 558 of the transistor T8 so as to be able to serve as the gate electrode.

In the present disclosure, the exemplary embodiments may provide a micro LED pixel circuit capable of grayscale implementation through a PWM driving manner based on an LTPO TFT, and a display including the same. The pixel circuit according to the exemplary embodiments may supply a constant current to the micro LED according to PWM driving regardless of the threshold voltage of the driving transistor without an IR drop.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: Display
10: Timing Controller
20: Scan Driver
30: Data Driver
40: Compensation Driver
50: Light Emitting Driver
60: Duty Driver
70: Power Supply Circuit
80: Display Unit
100: Complementary Transistor
200: First Transistor
300: Second Transistor

What is claimed is:

1. A pixel comprising:
a micro LED;
a pulse width modulation (PWM) adjustment circuit that includes an inverter, and controls a light emission period of the micro LED on the basis of an output of the inverter according to a data voltage which is provided to an input terminal of the inverter and a duty driving signal; and
a constant current (CC) generating circuit that provides a constant current to the micro LED for the light emission period,
wherein the inverter is implemented with low-temperature polycrystalline silicon and oxide (LTPO) thin-film transistors.

2. The pixel of claim 1, wherein:
the PWM adjustment circuit includes the following:
a first transistor that includes one terminal to which the data voltage is input, and is switched in response to a scan signal so as to transfer the data voltage to a first node;
a second transistor that includes one terminal to which an initialization voltage is input, and is switched in response to a previous scan signal having an on level for a predetermined period before the scan signal so as to transfer the initialization voltage to the first node;
a first capacitor that includes one terminal to which the duty driving signal is input, and another terminal which is connected to the first node; and
a second capacitor that is connected between the first node and a second node, and
the second node is connected to the input terminal of the inverter.

3. The pixel of claim 2, wherein:
the inverter includes the following:
a third transistor that includes a gate which is connected to the second node, one terminal to which a first voltage is supplied, and another terminal which is connected to a third node; and
a fourth transistor that includes a gate which is connected to the second node, one terminal to which a second voltage is supplied, and another terminal which is connected to the third node, and
the third transistor is a low-temperature polycrystalline silicon (LTPS) TFT, and the fourth transistor is an oxide TFT.

4. The pixel of claim 3, wherein:
the PWM adjustment circuit further includes a fifth transistor that is connected between the second node and the third node and includes a gate to which the previous scan signal is applied.

5. The pixel of claim 4, wherein:
the PWM adjustment circuit further includes the following:
a sixth transistor that includes a gate to which a first light emission signal is applied, one terminal which is connected to the third node, and another terminal which is connected to a fourth node; and
a seventh transistor that includes a gate to which the first light emission signal is applied, one terminal to which a first source voltage is supplied, and another terminal which is connected to the fourth node, and
the first light emission signal is at an on level for a first light emission period within a frame.

6. The pixel of claim 2, wherein:
the CC generating circuit includes the following:
a third capacitor that is connected between an output terminal of the PWM adjustment circuit and a fifth node;
a tenth transistor that includes a gate which is connected to the fifth node, one terminal to which a third voltage is supplied, and another terminal which is connected to a sixth node; and
an eleventh transistor that is connected between the sixth node and the micro LED and includes a gate to which a second light emission signal is applied, and
the second light emission signal is at an on level for the first light emission period.

7. The pixel of claim 6, wherein:
the CC generating circuit further includes the following:
an eighth transistor that includes one terminal which is connected to the fifth node and another terminal to which the initialization voltage is supplied, and is switched in response to a first compensation signal so as to transfer the initialization voltage to the fifth node; and
a ninth transistor that is connected between the fifth node and the sixth node, and is switched in response to a second compensation signal so as to compensate the threshold voltage of the tenth transistor.

8. The pixel of claim 1, wherein:
a voltage level of the duty driving signal varies during a first light emission period within a frame, and a voltage level of the input of the inverter varies in response to the duty driving signal such that the output of the inverter is inverted.

9. A μ-LED display comprising:
a plurality of pixels;
a data driver that supplies a plurality of data voltages corresponding to the plurality of pixels;

a scan driver that supplies a plurality of scan signals corresponding to the plurality of pixels; and a duty driver that supplies a duty driving signal for controlling a light emission period to the plurality of pixels, wherein each of the plurality of pixels includes the following:

a micro LED;

a pulse width modulation (PWM) adjustment circuit that includes an inverter, changes an input according to the corresponding data voltage in response to the duty driving signal, provides the changed input to an input terminal of the inverter, and controls a light emission period of the micro LED in response to the output of the inverter; and a constant current (CC) generating circuit that provides a constant current to the micro LED for the light emission period.

10. The μ-LED display of claim 9, wherein:

the PWM adjustment circuit includes the following:

a first transistor that supplies the corresponding data voltage to a first node in response to the corresponding scan signal;

a second transistor that transfers an initialization voltage to the first node in response to a previous scan signal to the corresponding scan signal;

a first capacitor that includes one terminal to which the duty driving signal is input, and another terminal which is connected to the first node; and a second capacitor that is connected between the first node and a second node, and the second node is connected to the input terminal of the inverter.

11. The μ-LED display of claim 10, wherein:

the inverter includes the following:

a third transistor that includes a gate which is connected to the second node, one terminal to which a first voltage is supplied, and another terminal which is connected to a third node; and a fourth transistor that includes a gate which is connected to the second node, one terminal to which a second voltage is supplied, and another terminal which is connected to the third node.

12. The μ-LED display of claim 11, wherein:

the PWM adjustment circuit further includes a fifth transistor that is connected between the second node and the third node and includes a gate to which the previous scan signal is applied.

13. The μ-LED display of claim 12, further comprising:

a light emission driver that generates and provides a first light emission signal and a second light emission signal for controlling a first light emission period within a frame with respect to the plurality of pixels, wherein the PWM adjustment circuit further includes the following:

a sixth transistor that includes a gate to which a first light emission signal is applied, one terminal which is connected to the third node, and another terminal which is connected to a fourth node; and a seventh transistor that includes a gate to which the first light emission signal is applied, one terminal to which a first source voltage is supplied, and another terminal which is connected to the fourth node.

14. The μ-LED display of claim 13, wherein:

the CC generating circuit includes the following:

a third capacitor that is connected between an output terminal of the PWM adjustment circuit and a fifth node;

a tenth transistor that includes a gate which is connected to the fifth node, one terminal to which a third voltage is supplied, and another terminal which is connected to a sixth node; and an eleventh transistor that is connected between the sixth node and the micro LED and includes a gate to which the second light emission signal is applied.

15. The μ-LED display of claim 14, further comprising:

a compensation driver that generates a first compensation signal for controlling an initialization operation on the fifth node, and a second compensation signal for controlling an operation of compensating the threshold voltage of the tenth transistor, wherein the CC generating circuit further includes the following:

an eighth transistor that includes one terminal which is connected to the fifth node, another terminal to which the initialization voltage is supplied, and a gate to which the first compensation signal is supplied; and a ninth transistor that is connected between the fifth node and the sixth node, and includes a gate to which the second compensation signal is supplied.

16. A pixel comprising:

a first wiring line that supplies a duty driving signal and extends in a first direction;

a first electrode that extends in a second direction, different from the first direction, from the first wiring line;

a second electrode that constitutes a first capacitor together with the first electrode;

a third electrode that constitutes a second capacitor together with the second electrode;

a first gate electrode that is connected to the third electrode and overlaps a first semiconductor layer;

a second gate electrode that is connected to the third electrode and overlaps the first semiconductor layer; and a third gate electrode that is connected to the second gate electrode and overlaps a second semiconductor layer, wherein a fourth transistor which includes the first semiconductor layer, the first gate electrode, and the second gate electrode, and a third transistor which includes the second semiconductor layer and the third gate electrode constitute an inverter.

17. The pixel of claim 16, further comprising:

a second wiring line that extends in the second direction and supplies a data voltage;

a third wiring line that extends in the first direction and supplies a scan signal;

a fourth wiring line that extends in the second direction and supplies an initialization voltage;

a fifth wiring line that extends in the first direction and supplies a previous scan signal;

a first transistor that includes one terminal which is connected to the second wiring line, a third semiconductor layer which overlaps the third wiring line, and another terminal which is connected to the second electrode; and a second transistor that includes one terminal which is connected to the fourth wiring line, a fourth semiconductor layer which overlaps the fifth wiring line, and another terminal which is connected to the second electrode.

18. The pixel of claim 16, further comprising:

a fourth electrode that is connected to one terminal of the third transistor;

a fifth electrode that is connected to one terminal of the fourth transistor and the fourth electrode;

a sixth wiring line that extends in the first direction and supplies a light emission signal;

a fourth gate electrode that is connected to a sixth electrode extending in the second direction from the sixth wiring line, and overlaps a fifth semiconductor layer;

a fifth gate electrode that is connected to the sixth electrode and overlaps the fifth semiconductor layer; and a sixth transistor that includes one terminal which is connected to the fifth electrode, the fifth semiconductor layer, the fourth gate electrode, and the fifth gate electrode.

19. The pixel of claim 18, further comprising:

a seventh wiring line that extends in the second direction and supplies a first voltage;

a seventh electrode that is connected to the seventh wiring line; and a seventh transistor that includes a sixth semiconductor layer which overlaps the sixth wiring line, and one terminal which is connected to the seventh electrode.

20. The pixel of claim 19, further comprising:

an eighth electrode that is connected to another terminal of the sixth transistor;

a ninth electrode that is connected to another terminal of the seventh transistor;

a tenth electrode that is connected to the eighth electrode and the ninth electrode; and an eleventh electrode that constitutes a third capacitor together with the tenth electrode.

* * * * *